United States Patent [19]

Kacar et al.

[11] Patent Number: 4,943,105

[45] Date of Patent: Jul. 24, 1990

[54] AUTOMOBILE PET SEAT AND CARGO CARRIER

[76] Inventors: David J. Kacar; Cynthia R. Kacar, both of 1509 King St., Alexandria, Va. 22314

[21] Appl. No.: 397,285

[22] Filed: Aug. 23, 1989

Related U.S. Application Data

[63] Continuation-in-part of Ser. No. 329,259, Mar. 27, 1989, abandoned, and Ser. No. 347,011, Jun. 16, 1989, abandoned.

[51] Int. Cl.$^5$ .............................................. B60R 21/04
[52] U.S. Cl. ................................... 296/24.2; 296/39.1; 119/15; 297/229; 5/94
[58] Field of Search .................... 296/39.1, 24.1, 24.2, 296/; 224/275, 42.42; 119/15; 297/219, 229, 254, 255, 256; 5/94, 98 R, 417, 418; D30/118

[56] References Cited

U.S. PATENT DOCUMENTS

| | | | |
|---|---|---|---|
| 245,716 | 9/1977 | Russo | D30/41 |
| 1,233,661 | 7/1917 | Gordon | 5/118 |
| 1,263,097 | 4/1918 | Moormeister | 5/98 R |
| 1,962,215 | 6/1934 | Sallop | 297/219 |
| 2,254,332 | 9/1941 | Tibbetts | 5/94 X |
| 2,641,773 | 6/1953 | Kramer | 5/94 |
| 2,648,072 | 8/1953 | De Blieux | 5/94 |
| 2,649,593 | 8/1953 | Kirsten | 5/94 |
| 3,648,306 | 3/1972 | Auerbach | 5/94 |
| 4,232,413 | 11/1980 | Mongautt | 5/94 |
| 4,512,286 | 6/1983 | Rux | 119/96 |
| 4,723,814 | 2/1988 | Hunt | 297/219 |

FOREIGN PATENT DOCUMENTS

| | | | |
|---|---|---|---|
| 692151 | 8/1964 | Canada | 5/94 |
| 2403767 | 5/1979 | France | 5/94 |

OTHER PUBLICATIONS

"Back Seat of Car Makes Crib", *Popular Science*, Feb. 1951, p. 151.
"Hammock Keeps Baby Comfortable in Car", *Popular Mechanics*, Feb. 1957, p. 145.
Willis, "Back Seat of Car Converted to Playpen Eliminates Safety Hazard", *Popular Mechanics*, vol. 91/#1, Jan. 1949, p. 174.
W. A. Gibbs, "Auto Play Pen", *Mechanix Illustrated*, Feb. 1955, p. 181.
Merlo Inc., advertisement for travelbed, *Pet Product News*, Mar./Apr. 1989, p. 49.

Primary Examiner—Margaret A. Facarino
Assistant Examiner—Gary C. Hoge

[57] ABSTRACT

An invention made from three fabric covered panels for supporting and protecting pets and cargo in the back seat of an automobile. Bottom and front rigid panels fold into an "L" shape by the inclusion of a fold line in a single rigid material enclosed in a fabric pouch. The bottom and front panels extend over and close off the lower floor compartment and front seat opening, therefore, preventing the pet or cargo from falling forward into these areas of the automobile. Continuous fabric straps attach to and extend from the fabric pouch providing structural integrity to the invention in its installed position by securing to specific attachment points of the automobile. The bottom and front rigid panel also have a removable rigid material for cleaning of the fabric portion.

10 Claims, 1 Drawing Sheet

AUTOMOBILE PET SEAT AND CARGO CARRIER

CROSS REFERENCES TO RELATED APPLICATIONS

This application is a continuation in part or two previous applications, Ser. No. 07/329,259 filed Mar. 27, 1989, now abandoned, and Ser. No. 07/347,011 filed June 16, 1989, now abandoned.

BACKGROUND OF THE INVENTION

1. Field of the Invention

This invention relates to a device for the transport of pets, such as dogs, and cargo in vehicles. More particularly, it relates to a fabric covering which protects the vehicle interior and is made rigid at the base and front by the insertion of a cardboard or other similar rigid material. The platform and front panel formed by the fabric pouch an the rigid material is cushioned with foam and provides a wide, soft surface and forward restraint for pets and cargo while traveling in the back of the vehicle.

2. Description of Prior Art

Devices used to transport pets in vehicles have generally been of the container type for small dogs which strap or hook on the seats of the automobile providing a comfortable ride and an exterior view for the animal. For example, Russo, U.S. Pat. No. Des. 245,716, provides a container type device with a foam insert and hooks which provide various mounting methods. Rux, U.S. Pat. No. 4,512,286 is another example of a similar device for carrying small dogs.

The other area of prior art is automobile rear seat extension devices used as beds and platforms for the transport of small children and cargo. Most of these predate the present safety requirements for the restraint of children in auto seats and safety belts.

The patent to Gordon, U.S. Pat. No. 1,233,661 sets forth the earliest device for carrying cargo in the rear seat area of an automobile with the device utilizing unspecified rigid material and a lower rigid support device from the floor.

The patent to De Blieux, U.S. Pat. No. 2,648,072 sets forth an inflatable device to be used as a bed for children which covers the entire horizontal back seat of a vehicle and receives support from an inflatable bottom portion at the floor compartment.

The patent to Kirsten, U.S. Pat. No. 2,649,593 sets forth a travel unit for children with limited seat coverage and is more correctly defined as a compartmental device for restraining movement.

The patent to Schiffmann, Canadian Pat. No. 692151 sets forth a child travel bed and cargo transport device utilizing rigid adjustable hooks which hold the device horizontal over the floor compartment. This device discloses the most pertinent art to the present invention with its utilization of a rigid platform, rigid adjustable straps attached to the front seat, and the use of a partial resilient pad covering.

The patent to Auerbach, U.S. Pat. No. 3,648,306 is another inflatable device which is generally and partially held in place by the securement of seat belts over portions of the horizontal inflatable pad.

The patent to Mongault, U.S. Pat. No. 4,232,413 sets forth a cot type device utilizing cloth stretched between a tubular metal frame with support over the floor compartment achieved by the use of a rigid floor support or an alternate rigid hook attached to an indeterminate portion of the sides of the front seat.

Other pertinent published art includes a product exhibited in Mechanix Illustrated. "Auto Plan Pen" published in February, 1955, page 181 which comprises a plywood board resting on the back seat of an automobile and extending over the lower floor compartment supported by an adjustable metal pipe. Another design published in Popular Mechanics in January 1949, page 174 illustrates a canvas sling which has a wood dowel at each end and attaches by tucking into the space between the lower back seat cushions and to the hand straps of the center post of each door on earlier model cars.

More recent art is a travel bed produced by Meblo Inc. which is published in pet trade magazines and illustrated in "Pet Product News", March/April, 1989, page 49. This bed is more appropriately labeled a sling which covers the back seat and the back of the front seat of an automobile. The design has numerous limitations which the present invention has corrected and improved upon. The Meblo travel bed does not provide a rigid platform and restraining attachments thereby preventing the pet's forward motion into the lower floor compartment during sudden vehicle stops. Also, the rear fabric attachment relies solely on the end straps secured to seat belt restraining devices, and is not restrained along its entire top edge.

None of these seat cushions, carrier devices provide for a rigid panel coverage of the rear seat and back of the front seats with a removable fabric covering which provides a primary role in the structural seat extension support and securement of the device. In addition, the present invention is designed for flexible securement of the device utilizing fabric straps which are a part of and extend from the seat cover as a whole. This fabric covering, fabric straps, and securement is a unique design with specific flexibility advantages over all previous art.

The present invention for the rear seat extension and coverage is designed for use primarily by pets or cargo, and specifically by dogs, which no earlier patented art has claimed.

As such, the front rigid vertical panel prevents the pet or cargo from falling forward into the front of the vehicle in autos with bucket seats. Furthermore, this panel prevents forward movement into the floor compartment of the rear seat since all vehicles are different in size with the distance from the verticals of the rear seat and the back of the front seat varying greatly. No other prior art combines a folded rigid panel for flexibility with the added benefits of full coverage of the entire back seat.

DESCRIPTION OF THE PREFERRED EMBODIMENT

Figure 1:
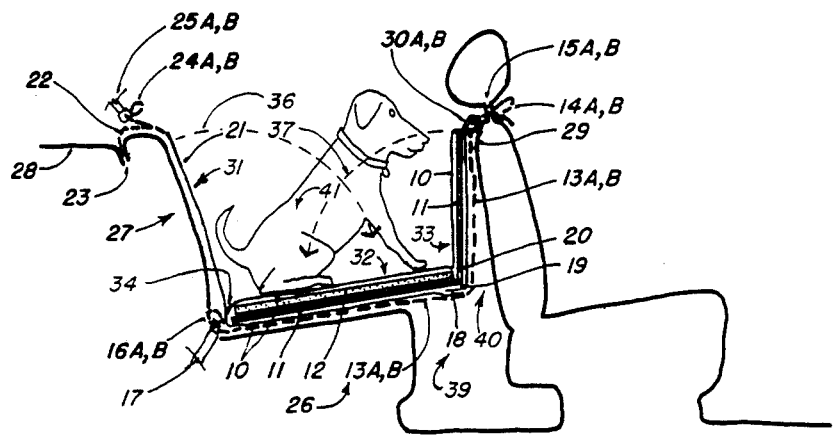
FIG. 1 is a cross-sectional view of the device showing it in its installed position with a dog siting in an upright position.
Figure 2:
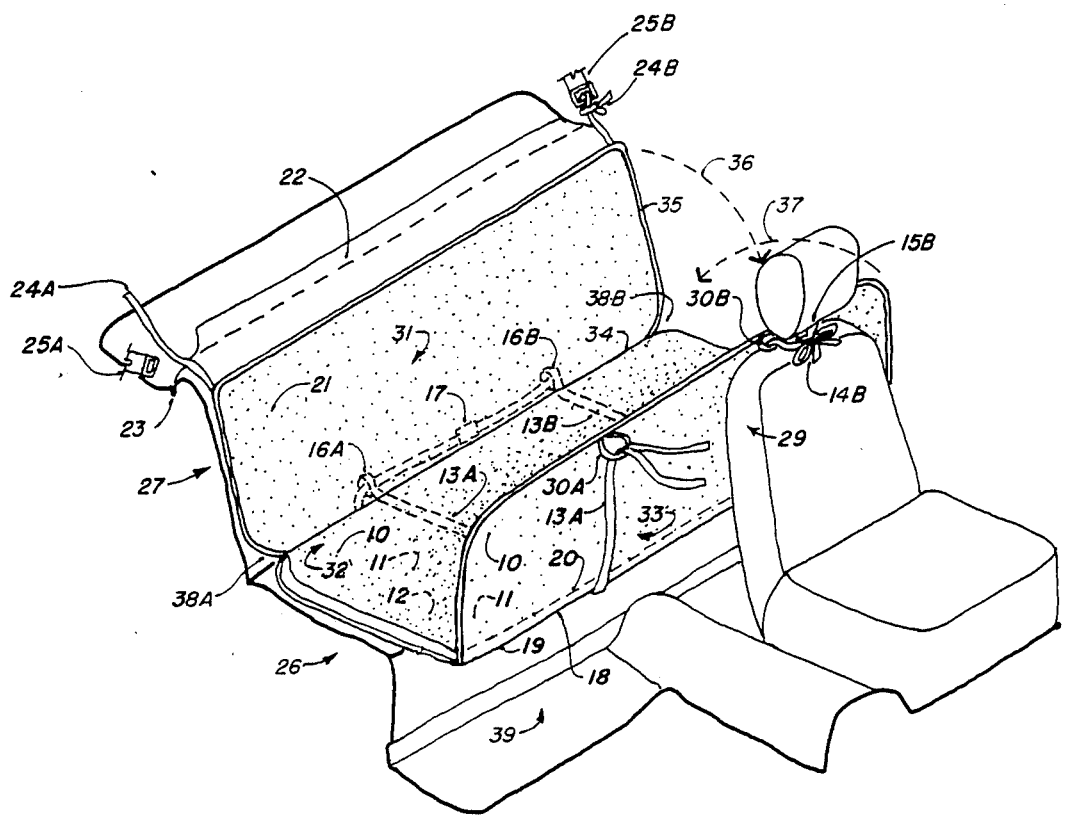
FIG. 2 is an isometric view of the device showing it in its installed position.

Referring to FIG. 1 and FIG. 2, the device is comprised of three panels 31, 32, and 33. Panel 31 is a back panel comprised of a quilted material 21 with foam sandwiched between sewn fabric. This panel 31 sets against and covers the back vertical section of the rear seat 27. It is attached to the bottom rigid panel 32 by means of a sewn seam 34 continuous along the length between panels. Panel 31 also has an extension fabric 22 which is continuous along the top edge of panel 31 and provides a tuck-in attachment into the crevice 23 formed by the gap between the back seat 27 and the horizontal portion of the rear window compartment 28. Additional attachment restraining means is provided by fabric strap extensions 24 A, B on each side of the fabric tuck-in which are also sewn to the panel 31. These fabric strap extensions 24 A, B tie to the seat belt restraining devices or other attachment points 25 A, B at each side of the vehicle seat, and serve as additional means of attachment or sole means of attachment in vehicles with no tuck-in point for fabric extension 22. Panel 31 is also curved at the bottom edge at point 38 A, B in order to conform to the outward curvature of the seat back 27 and seat base 26. All panels have a fabric edging 35.

Continuing to refer to FIG. 1 and FIG. 2, panel 32 is a bottom rigid panel comprised of a fabric pouch 10, a rigid cardboard or other rigid material 11, and a soft foam panel 12. Panel 32 is attached to the back panel by means of a sewn seam. Panel 32 is continuous with panel 33 but differentiated by a fold line 19 in the rigid material 11 permitting an "L" shaped rigid form. Sewn to the underside of panel 32 are two fabric straps 13 A, B which provide additional structural integrity and attachment means to the invention. The bottom rigid panel 32 rests on the rear seat 26 conforming to its slope in a substantially horizontal position, and extends over the open space of the lower floor compartment 39 providing wide stable surface for pets or cargo. Panel 32 is curved at point 38 A, B in order to conform to the curvature of the back seat 27.

As also shown in FIG. 1 and FIG. 2, panel 33 is a front rigid panel comprised of a fabric pouch 10, and a rigid cardboard or other rigid material 11. Panel 33 is continuous with panel 32 but differentiated by a fold line 19 in the rigid material 11 permitting an "L" shaped rigid form closing the open gap 40 left over by the bottom panel and the space behind the front seat 29. The rigid material of the front panel 33 has an additional fold line 20 which permits the folding of panel 33 over the thicker panel 31 as shown by dashed line 37

Fabric loops 30 A, B attach to the top of panel 31 allowing fabric straps 13 A, B to pass through thereby restricting their movement along the top of panel 33. Loops 30 A, B are sufficiently long to provide flexibility in attachment location of straps 13 A, B and may be additionally tied in a shorter length in order to prevent further movement. Straps 13 A, B are not attached to panel 33, but rest against it providing additional structural integrity preventing the forward movement of panel 33. After passing through loops 30 A, B, straps 13 A, B are secured and tied into a knot 14 A, B around the head restraining device 15 A, B of the front seats 29 of the vehicle. This attachment means pulls the front panel 31 against the back of the front seat 29 and provides a contributing support function for panel 32 over the open lower floor compartment 39.

Straps 13 A, B are additionally formed into a closed sewn loop 16 A, B at the back of bottom panel 32 providing attachment means through the passing of each loop by the seat belts 17 of the rear seat 26. The seats belts 17 are buckled and drawn tight thereby restricting movement of the bottom panel 32 and the back panel 31.

The fabric 10 of panels 32 and 33 is formed into a pouch and completely encases the rigid material 11 and the foam 12. An open flap 18 with securement devices permits the removal of the enclosed rigid material 11 and the foam 12 when the panel 33 is folded over bottom panel 32 indicated in FIG. 1 and FIG. 2 by dashed line 37. Removal of the rigid material 11 and foam 12 allows the washing and cleaning of the invention due to soilment by pets or cargo. The folding of the back panel 31 over the bottom panel 32 as shown with the dashed line 36, and the folding of the front panel 33 over the bottom panel 32 as shown with the dashed line 37, permits a compact condition of the invention for ease of handling, carrying, and storage in the automobile trunk or home of the user. A convenient and useful carrying case with handles will also be provided with the invention for further ease of handling and protection during storage.

FIG. 1 shows a dog 41 sitting on the invention in it installed position. The dog 41 or cargo, not shown, receives the benefits of the additional surface area for sure footing provided by the bottom rigid seat extension 32 over the lower floor compartment 39. The front rigid panel 33 will prevent the dog 41 or cargo, not shown, from falling into the open gap 40 of the lower floor compartment 39, and will prevent them from falling forward into the front section of the automobile during sudden stops or other unexpected movements. This safety feature will be particularly evident in vehicles with openings between their front seats. The wide cushioned, rigid platform 32 will provide a substantially level surface for the pet to move around, sit, and lay during transport. An additional use and advantage of the invention is for the protection of seats.

It should be understood that many modifications and variations may be made to the pet seat of the invention within the spirit and scope of the invention. Accordingly, the invention should not be limited by the description of the foregoing preferred embodiment thereof, but rather should be considered limited only by the following claims.

We claim:

1. A device for supporting and protecting a pet or cargo in a back seat of a vehicle having a front seat defining a front seat, a back seat having a back upright portion and a back seat cushion having a slope and a back seat surface area, said vehicle further including a lower floor compartment behind the front seat, said device comprising:

bottom rigid panel means for effectively extending the back seat surface area giving a pet or cargo a wider surface for comfort and stability during vehicle movement, front rigid panel means for preventing a pet or cargo from falling forward into the front seat area past the front seat and from falling forward into the lower floor compartment, and back soft panel means for protecting the back upright portion of the back seat, said device further comprising mounting means for fastening the device to specific attachment points of the vehicle, said front rigid panel means, bottom rigid panel means, and back soft panel means substantially covering the entire back seat, the lower floor compartment, and a back portion of the front seat, said bottom rigid panel means and said front rigid panels means each comprising a fabric pouch means substantially enclosing a panel of rigid material.

2. The device of claim 1 wherein the panels of rigid material are formed of a continuous panel of rigid material folded into an "L"-shape by folding along hinge means.

3. The device of claim 1 further comprising opening means facilitating the removal of the panels of rigid material.

4. The device of claim 3 wherein said opening means is an opening flap.

5. The device of claim 1 wherein the bottom rigid panel means includes a soft foam insert providing a protective cushion for pets or cargo during transport.

6. The device of claim 1 wherein said mounting means includes continuous strap means for holding said bottom rigid panel means in a substantially horizontal position conforming to the slope of the back seat and extending over said lower floor compartment.

7. The device of claim 6 wherein said front rigid panel means has a last one loop attachment means attached to an upper end thereof for slidingly guiding the continuous strap means, said continuous strap means maintaining said front rigid panel means in a substantially vertical position.

8. The device of claim 7 wherein said continuous strap means includes at least one strap which is sewn to an underside of said bottom rigid panel means, said strap forming loop means at one end thereof through which seat belts extend and couple together, thus providing direct and secure attachment of said device to said back seat, said strap extending from a lower end of said front rigid panel means through said loop attachment means at another end thereof for attaching to a headrest means of said front seat, said strap providing additional structural integrity to the bottom rigid panel means as it extends over said lower floor compartment and to said front rigid panel means as it restrains objects falling forward.

9. The device of claim 1 wherein said back soft panel means has attached thereto a continuous fabric extension sewn along an entire upper end of said back soft panel means, said extension being adapted to tuck into a gap between the back seat and a rear window ledge, said restraining means further comprising at least one strap means extending from the upper end of said back soft panel means to a seat belt attachment point.

10. The device of claim 9 wherein said back soft panel means comprises two fabric layers surrounding a thin layer of foam and sewn together in a quilted pattern, said thin layer of foam providing cushioning.

* * * * *